(12) United States Patent
Hellwig et al.

(10) Patent No.: US 7,020,149 B1
(45) Date of Patent: Mar. 28, 2006

(54) METHOD FOR OPERATING A SWITCHING SYSTEM FOR DATA PACKETS

(75) Inventors: Mathias Hellwig, Buchloe (DE); Andreas Kirstädter, Ebersberg (DE)

(73) Assignee: Infineon Technologies AG, Munich (DE)

( * ) Notice: Subject to any disclaimer, the term of this patent is extended or adjusted under 35 U.S.C. 154(b) by 707 days.

(21) Appl. No.: 09/627,178

(22) Filed: Jul. 27, 2000

(30) Foreign Application Priority Data

Jul. 27, 1999 (DE) .............................. 199 35 127

(51) Int. Cl.
*H04L 12/56* (2006.01)

(52) U.S. Cl. ...................................... 370/412; 370/428

(58) Field of Classification Search .............. 370/412, 370/415

See application file for complete search history.

(56) References Cited

U.S. PATENT DOCUMENTS

| 4,135,156 A | * | 1/1979 | Sanders et al. ............ 455/13.2 |
| 5,768,257 A | | 6/1998 | Khacherian et al. |
| 5,898,687 A | * | 4/1999 | Harriman et al. ........... 370/390 |
| 6,483,842 B1 | * | 11/2002 | Mauger ...................... 370/420 |

FOREIGN PATENT DOCUMENTS

EP            0 707 397 A2    4/1996

* cited by examiner

*Primary Examiner*—Brian Nguyen
*Assistant Examiner*—Tri H. Phan
(74) *Attorney, Agent, or Firm*—Laurence A. Greenberg; Werner H. Stemer; Ralph E. Locher

(57) ABSTRACT

A method for operating a switching system for data packets includes providing a switching system having inputs and outputs, temporarily storing data packets at an input of the switching system where, when each data packet arrives, merely sending a message to an output of the switching system at the input and placing the message into a queue at the output. The method combines advantages of temporary storage at the input with the advantages of temporary storage at the output, without having to accept the disadvantages of one of such systems.

9 Claims, 3 Drawing Sheets

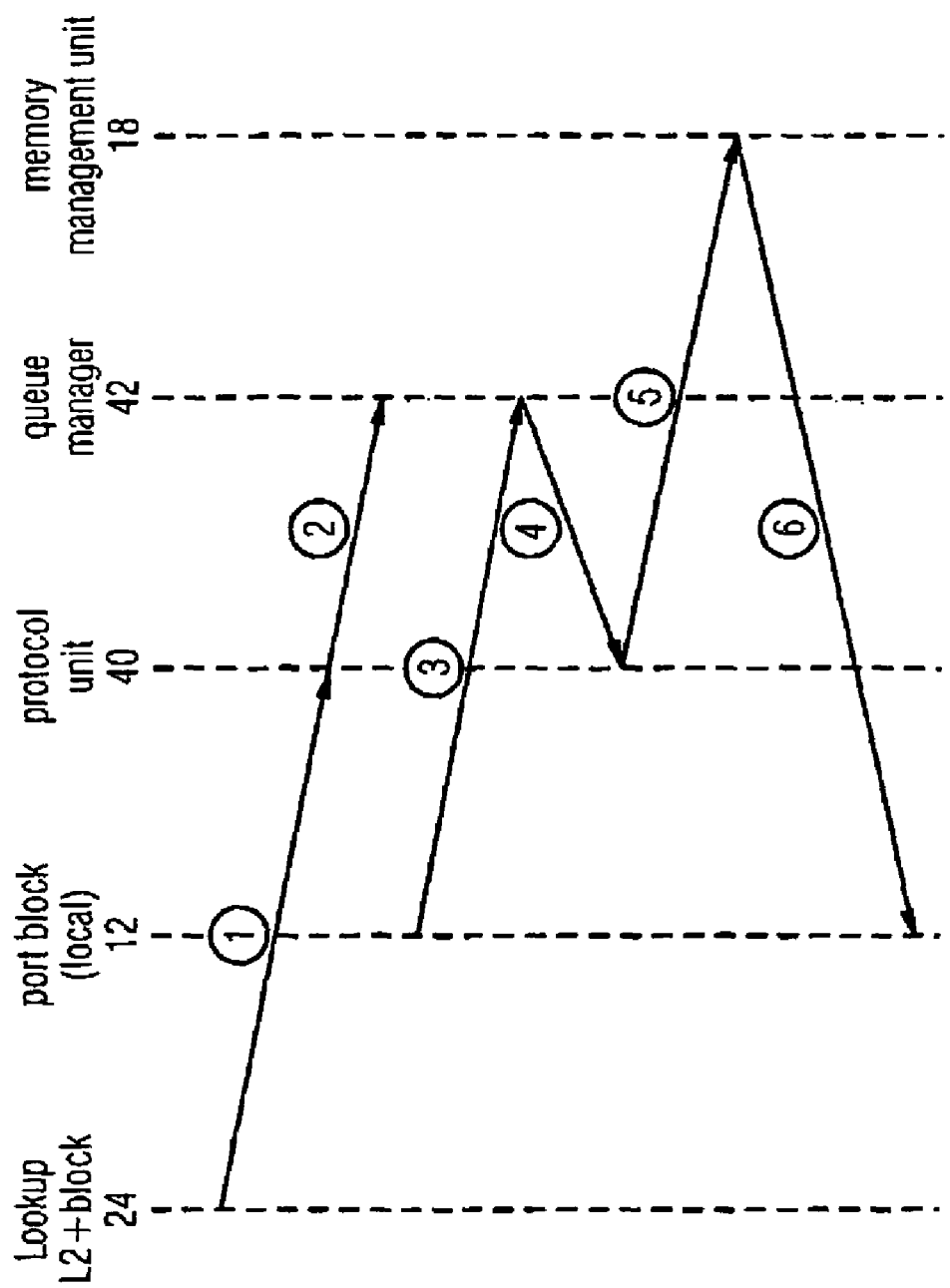

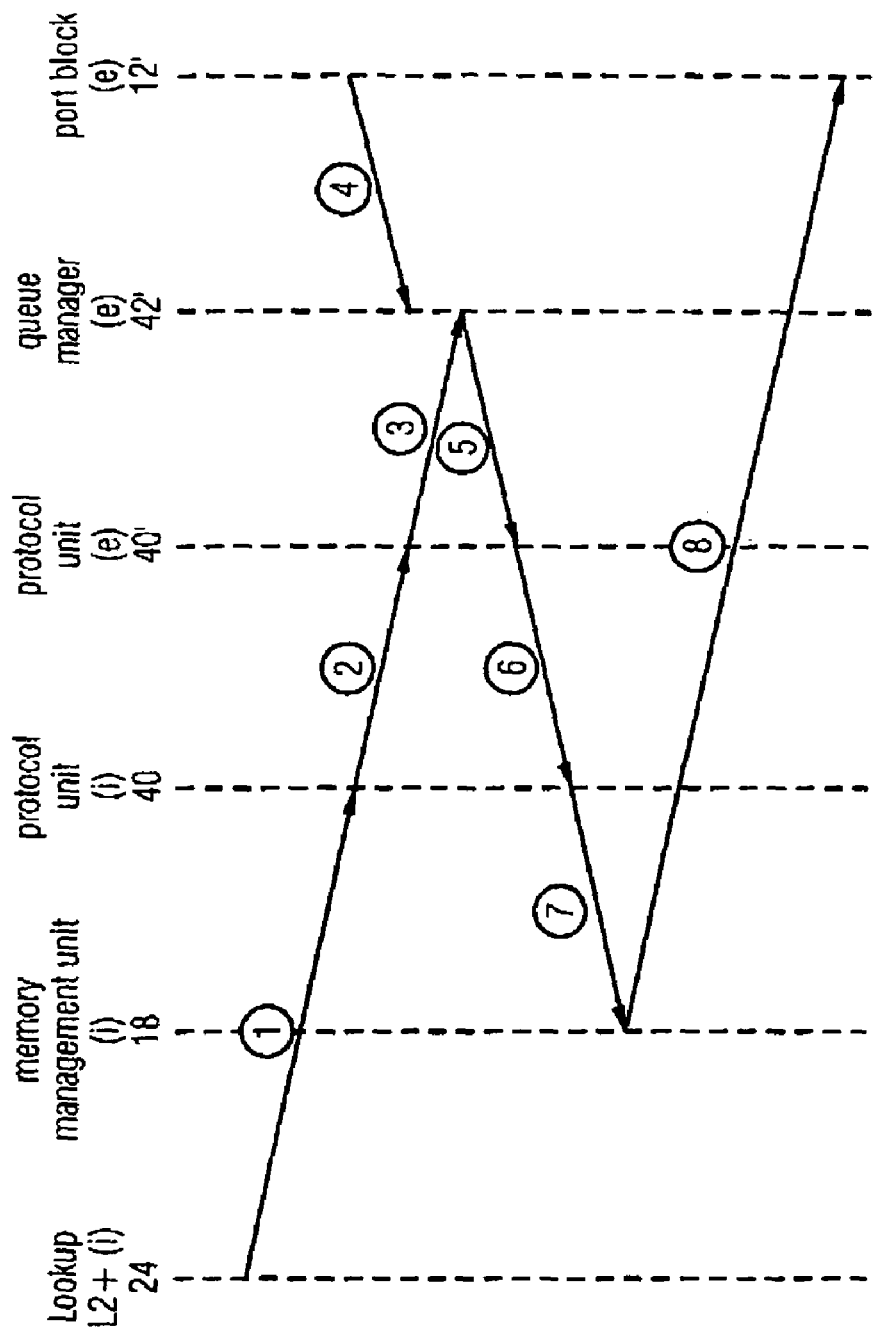

US 7,020,149 B1

METHOD FOR OPERATING A SWITCHING SYSTEM FOR DATA PACKETS

BACKGROUND OF THE INVENTION

Field of the Invention

The present invention relates to a method for operating a switching system for data packets having inputs and outputs, with temporary storage of the data packets at the input. Such switching systems for data packets are used, by way of example, for the design of local data networks (LAN=Local Area Network). An example of such a local data network is known by the name "ETHERNET" as a technical standard.

In such data networks, it is necessary for the data to be routed from a source to a destination in the form of data packets. This requires an appropriate switching system. On the basis of the prior art, the only solution there was for such switching systems for data packets in networks was either for the data packets to be temporarily stored at the input (INPUT BUFFERED) or for the data to be temporarily stored at the output (OUTPUT BUFFERED). Both solutions based on the prior art have considerable disadvantages. When the data packets are temporarily stored at the input, the system can be blocked by so-called "HEAD-OF-LINE BLOCKING". In addition, traffic control by allocating different priorities to different data packets, and hence preferential switching of particular, especially urgent data packets, is possible only with great difficulty.

In the case of temporary storage at the output, a very large bandwidth is required for the buffer at the output, and such a system with temporary storage at the output additionally requires a very rapid decision about the data path to be used (routing).

Systems having a common memory, which represent a combination of a buffer at the input and a buffer at the output, also require a high bandwidth for the memory.

To date, the only switching systems on the market with a high bandwidth are those with temporary storage at the output, for example from Texas Instruments, or very complicated systems having a common memory.

SUMMARY OF THE INVENTION

The object set by the present invention was therefore that of providing a method for operating a switching system for data packets having inputs and outputs, with temporary storage of the data packets at the input, which combines the advantages of temporary storage at the input with the advantages of temporary storage at the output without having their respective disadvantages.

The invention achieves this object by virtue of the feature that, when each data packet arrives, a message is merely sent to the output and is placed into the queue there. In this way, the transmission of data and the transmission of the information for defining the sequence for transmission of the data are independent of one another. The necessary bandwidth for the internal connections in the switching system is now determined exclusively by the bandwidth of the local physical inputs, with a small addition for the logical channel for the messages. Hence, the bandwidth of the internal connections is defined and is not dependent on the total data throughput of the system.

Further advantages of the invention are that it enables the outputs to be prevented from becoming overloaded or from idling unnecessarily. To this extent, the method according to the invention acts in the manner of a data flow controller. In addition, the invention makes it possible to direct and organize traffic in a switching system with temporary storage at the input in the same way as would otherwise be possible only with temporary storage at the output.

Thus, the invention enables the advantages of temporary storage at the input and at the output to be combined and, at the same time, enables the disadvantages of each of the two systems to be avoided.

A further preference of the invention is that the message contains a reference, information about the priority for correct marshaling of the data packet and information about the length of the packet. This allows traffic to be directed and organized exactly in the data network.

A particularly simple hardware implementation of the present invention is possible if the message is transmitted via the same physical transmission path, but via a separate logical channel, as the data packets.

One preference of the invention is for a further message to be returned to the input memory from the output as soon as the data packet can be dispatched via the output, and only then for the data packet to be transmitted to the appropriate destination. It is then particularly preferred if the further message contains information about the destination of the data packet.

In order to reduce further the bandwidths necessary for transmitting the individual messages, it is particularly preferable according to the invention for the messages to be combined into message packets which are transmitted together via the switching system. It is then also preferable to use a data flow controller to handle transmission of the messages.

BRIEF DESCRIPTION OF THE DRAWINGS

The present invention is explained in more detail below with the aid of the appended drawings, in which:

FIG. 2 shows a flowchart for a switching procedure within a module; and

FIG. 3 shows a switching procedure between two modules.

DESCRIPTION OF THE PREFERRED EMBODIMENT

Figure 1:
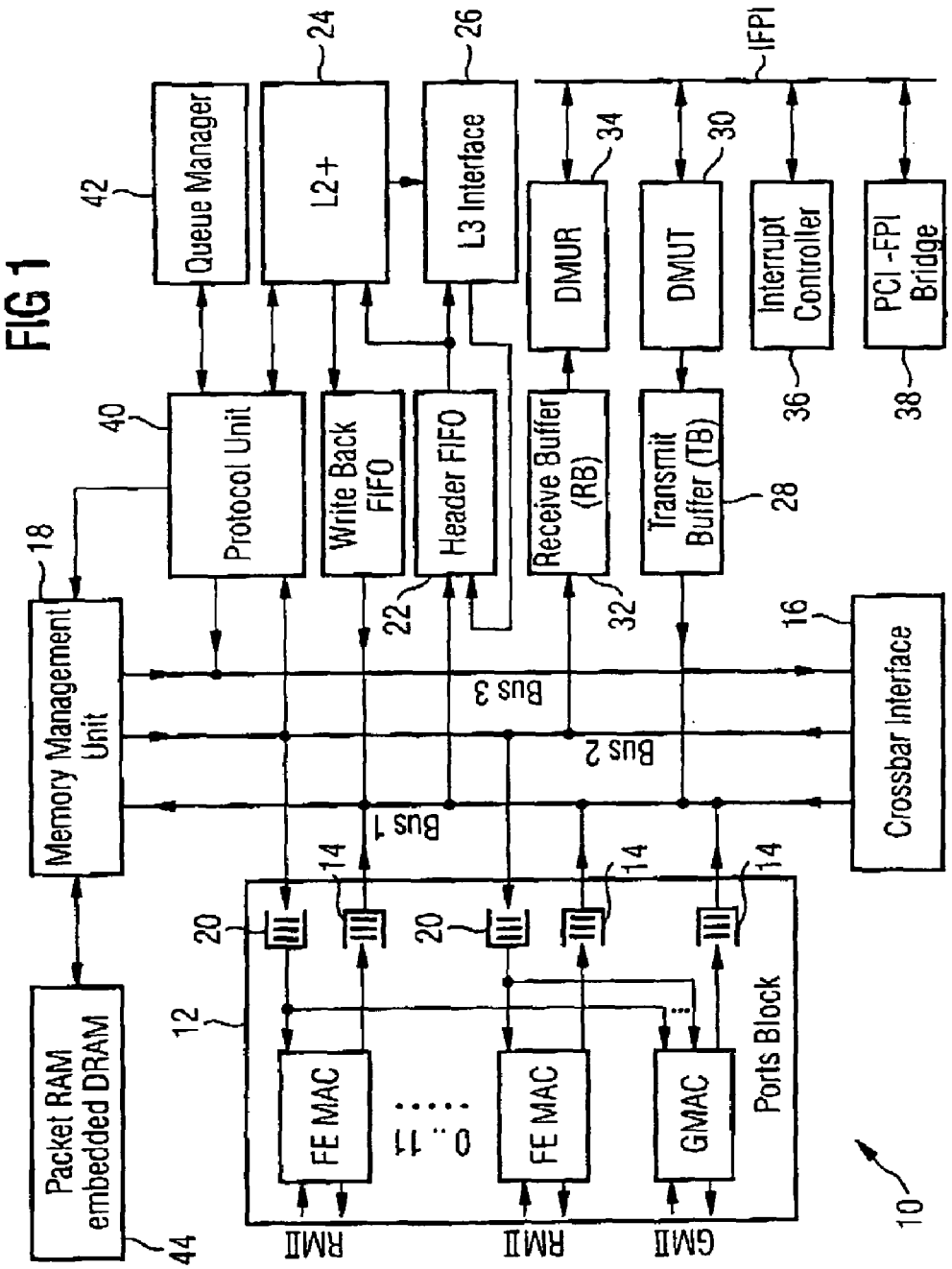
FIG. 1 shows a block diagram for an inventive switching system for data packets using the ETHERNET standard.

The present invention is described below with the aid of an illustrative embodiment which is in the form of a switching system for data packets for the ETHERNET standard.

As FIG. 1 shows, this switching system 10 is designed as follows:

The local area network is connected by means of the connection block (PORTS-BLOCK) 12. This connection block comprises twelve access control devices on lines with a data rate of 100 megabit/s and an access control unit for a data rate of 1 gigabit/s. The access controllers on the individual lines are denoted by MAC (Medium Access Control). The access controller designed for one gigabit/s is denoted by GMAC, and the access controllers designed for 100 megabit/s are denoted by FEMAC. The outputs of these access controllers are connected to the bus 1 via a respective FIFO (First-In-First-Out) memory 14. The bus 1 is additionally connected to a crossbar interface 16 and to a memory management unit 18. In this arrangement, the crossbar interface 16 and the memory management unit 18 are also connected by further buses 2 and 3. In addition, bus 2 is also connected to first-in-first-out memories 20 which collect the outgoing data packets and supply them either to one FEMAC each or to the GMAC together. The bus 1 is also connected to a header FIFO 22. This header FIFO 22 (First-In-First-Out memory for the address part of the data packet) stores a maximum of 128 bytes of the address range of each data packet. The header FIFO 22 is connected to the address evaluation circuit 24, 26 denoted by L2+ and L3 Interface.

Additionally connected to the bus 1 is the transmit buffer (TB) 28, which carries out the direct memory access operations from the main memory of the connected microprocessor or computer via an interface DMUT 30.

The bus 2 is likewise connected to the receive buffer (RB) 32, which carries out the corresponding write access operations directly to the main memory of the connected microprocessor or computer via a corresponding interface DMUR 34. Since, in this case, access operations are carried out using direct access (DMA—Direct Memory Access), an interrupt controller 36 and a PCI-FPI bridge 38 are also provided for synchronization with the microprocessor or computer. In addition, a protocol unit 40 is provided which is connected to the bus 2 and to a further bus 3, which in turn connects the memory management unit 18 and the crossbar interface 16. The protocol unit 40 is additionally connected to the queue manager 42.

The switching system shown in FIG. 1 essentially has five tasks:
1. To match the data rates, the switching system needs to store data and deliver it on request.
2. The switching system must be able to work with comprehensive time-consuming table references (Lookup) used by higher-level protocols. It is therefore necessary for the complete data packet to be temporarily stored before a decision can be made about the destination for forwarding the data packet. This means that the data packets need to be temporarily stored at the input.
3. Under some circumstances, the time taken for processing the table references, measured in clock cycles, may not be constant. This produces the need for temporary storage of the address parts of the data packets in a FIFO memory (Header FIFO) 22.
4. If data streams are to be processed in real time, it is necessary to define a sequence on the output side, in order to control the throughput as a function of the bandwidth per connection. Similarly, simple allocation of priorities during the data switching needs to be assured, and blocking (Head of line blocking) needs to be precluded.
5. Modification of the addresses must be possible, where not only can particular address fields be changed, but also parts of the address range can be added or erased.

On the basis of these requirements, the way in which the switching system for data packets shown in FIG. 1 works is described below:

An access controller receives a data packet on a line (Medium Access Control MAC) from the network (LAN) and writes it via the internal bus 1 to the packet memory 44, which is likewise connected to the memory management unit 18. To match the data rate between the input and the internal bus 1, a bus access controller and a first-in-first-out memory 14 need to be provided. The respective access controller also handles the tasks associated with the transmission protocol, such as throughput control. Connected to the bus 1 are twelve access controllers for a speed of 100 megabit/s (FEMAC) and an access controller for one gigabit/s (GMAC). However, only either the twelve FEMACs or the GMAC are active in each case. Hence, all the units connected to the bus 1 perceive no difference as to whether the data arrives via the GMAC or the FEMAC. The result of this is considerable simplification.

In transmission mode, the access controllers indicate receptivity if there are more than 1536 bytes of space in the appropriate transmit FIFO memory 20. A further data packet is then retrieved from the packet memory 44. The packet is transmitted via the bus 2 to the appropriate FIFO 20, and is assembled there. When the packet has been assembled completely, the access controller immediately indicates readiness to transmit again if there are still more than 1536 bytes free in its transmit FIFO memory 20. At the same time, transmission of the data packet via the appropriate line begins.

In the case of the GMAC, the request for an appropriate data packet for a FIFO memory 20 takes too long to utilize the transmission speed of the GMAC on the line fully. In this case, all twelve transmit FIFO memories 20 request and assemble frames in parallel. After assembly, the data packets are forwarded to the GMAC in the correct sequence and are transmitted onto the GIGABIT Ethernet line by the GMAC.

The text below uses FIG. 2 to describe the path of an individual data packet through the switching system shown in FIG. 1. All modifications of this path (local/remote, one receiver/a plurality of receivers) can be derived from this example.

When a data signal is recognized at the physical level, the start of a receive procedure is indicated to the appropriate access controller (MAC). The access controller removes preambles, limiters and the cyclic checksums after the check and adds a network address for a virtual LAN, provided that there is not already one available. The data packet is written to the receive FIFO memory 14 and, provided that the memory contains more than 128 bytes, or the entire packet comprises less than 128 bytes, the packet is written to the packet memory 44 in sections of 64 bytes via the bus 1 and the memory management unit 18. The first two sections are additionally copied to the header FIFO memory 22. A reference address for the data packet in the packet memory 44 is transmitted back by the memory management unit 18 and is likewise stored in the header FIFO memory 22. The first and last sections of a packet have a special significance. If the reception procedure was erroneous, for example on account of a checksum error or a collision, this will be discernable from the last section, and the memory management unit 18 will erase the packet from the packet memory 44 and from the header FIFO memory 22.

Once the entire packet has been received, the header FIFO memory 22 marshals the entry for processing by the address evaluation circuit 24. As soon as the address evaluation circuit 24 has free processing capacity, it takes the first entry in the memory 22 for processing.

Address processing can result in various measures. The assumption for this data packet is that it has a new source address and a known local destination address. In addition, the address can be changed in the network. The changed address is written back to the memory management unit 18. FIG. 2 shows the procedure after address determination as a message diagram. The address evaluation circuit 24 uses an "advertise" message 1 to instruct the protocol unit 40 to forward this message to the local queue manager 42 as message 2. The information transmitted is the reference address, the sequence designation and a few other items of information. The sequence information implicitly contains the local output connection and the priority of the data packet. Internally, the address evaluation circuit 24 adds the new source address to its address table and produces a "learn" message in order to inform the other line units in the system of how this new address can be reached, or resets the aging counter.

When an access controller MAC is able to transmit a data packet, it signals its availability to the queue manager 42 by means of a message 3. The queue manager 42 receives this availability information and a queue belonging to this local output connection is sought. Provided that a data packet is waiting to be transmitted there, the queue manager 42 sends the address of the reference element and the local output connection to the protocol unit 40 as message 4. The protocol unit 40 produces a message 5 for the memory management unit 18. The memory management unit 18 then starts to transmit the requested data packet via the bus 2 to the output FIFO memory 20 for the appropriate output connection. This procedure is denoted by 6 here. When transmission has ended correctly, the memory management unit 18 checks the counter for multiple transmissions, and, if this counter is counted down, the memory management unit 18 will enable the appropriate memory area in the data packet memory 44. As soon as the entire data packet has been transmitted to the transmit FIFO memory 20, the access controller begins to transmit the data packet onto the line.

If a data packet is to be transmitted via a further, remote switching system, as shown in FIG. 3, the reception procedure is the same, up to the address determination, as for a local path of the data packet. In this case, however, resolution of the references produces a nonlocal destination specification for the data packet. The "advertise" message is transmitted, with the input address of the data packet in the data packet memory 44 plus the input chip identification, from the protocol unit 40 to the opposite station at the output. The message thus runs from the address manager 24 to the dedicated protocol unit (message 1), and from there to the remote protocol unit 40' (message 2). At the output, the protocol unit 40' there forwards the message as message 3 to the queue manager 42' at the output. As soon as an access controller at the output is free for transmission and reports this by means of message 4, the queue manager 42' at the output requests the data packet from the memory management unit 18 at the input via protocol units 40', 40 at the output and input. In this way, the messages 5, 6 and 7 are produced. Using the chip and connection identification provided, the memory management unit 18 transmits the data packet to the connection block 12' at the output via the crossbar interface (crossbar) 16 (message 8). The only difference in this method as compared with the local path is the different way in which the queue manager receives and requests a data packet. In the present example, the connection block 12' is ready before the "advertise" message arrives in the queue manager 42'. This can occur with a low volume of data traffic.

The present invention thus uses an input-buffered architecture to permit detailed table references for route selection and assurance of service quality, and with regard to the reasonable demands on the memory bandwidth. According to the invention, however, in contrast to the usual prior art, a supplementary message protocol is introduced which merely transmits a reference, a sequence information item and a length information item to the output for each data packet received (called "advertise" message or announcement message). At the output, only this reference is marshaled into the queue. These messages require much less bandwidth than transmission of the entire packet to the output. The message protocol uses the same physical data link, but in a separate logical channel to the output, as the data packets. The marshaling of the references into a corresponding queue can be called virtual marshaling of the data packet. The transmitting physical output connection requests a data packet from the queue manager 42, and the reference to this data packet is sent back to the input buffer memory (request message) in which the data packet is stored, with the information being transmitted at the same time via the destination connection. The input buffer then transmits the data packet to the destination connection. When the data packet has arrived correctly, it is transmitted on the data line and the next data packet is requested from the queue manager 42.

Announcement and request messages going to the same chip can be combined in message packets in order to reduce the bandwidth required for transmitting them. A data flow controller can be used on the message traffic in order to prevent overload situations in the message channel and the message processing units.

The present invention separates, for the first time, the transmission of data from the transmission of the appropriate information to the sequence controller, which makes the system very open to matching. According to the invention, the necessary bandwidth of the internal data links is determined only by the bandwidth of the local physical connections plus a little surplus for the logical message channels. The bandwidth required for the internal connections is fixed and is not dependent on the total throughput of the system. The announcement/request message protocol of the present invention protects the outputs of the system against overload or unnecessary idling and, in this respect, acts in the manner of a throughput controller. The invention combines the advantages of input-buffered systems and output-buffered systems and avoids the disadvantages of these two solutions.

The announcement/request message protocol according to the invention permits input-buffered systems to perform the same traffic management as is otherwise possible only in the case of output-buffered systems.

The method according to the invention prevents blocking of the system, as can occur in input FIFO buffered systems, when the packet at the very front in the FIFO buffer cannot be switched immediately.

We claim:

1. A method for operating a switching system for data packets having variable lengths, which comprises:
   providing a switching system having inputs and outputs;
   temporarily storing complete data packets at an input of the switching system;
   if a data packet is received for transmitting to another switching system, sending only a message so that a transmission of data and a transmission of information for defining a sequence for the transmission of the data are independent of one another to an output of the switching system, the message containing a reference, information about priority for correct marshalling of the data packet, and information about a length of the data packet;
   queuing a message packet containing at least one message in a waiting queue at the output of the switching system; and
   returning a further message to an input memory from an appropriate output as soon as the data packet can be dispatched through the output, and only then transmitting the data packet to an appropriate destination.

2. The method according to claim 1, wherein the sending step is performed by sending the message packet along a given transmission path, and which further comprises trans mitting the data packet through the given transmission path but through a separate logical channel.

3. The method according to claim 2, wherein the given transmission path is a physical transmission path.

4. The method according to claim 1, wherein the returning step is performed by returning the further message containing information about the destination of the data packet.

5. The method according to claim 1, which further comprises transmitting message packets, each containing multiple messages, together with the data packets through the switching system.

6. The method according to claim 1, which further comprises handling transmission of a message with a data flow controller.

7. The method according to claim 1, which further comprises handling transmission of messages with a data flow controller.

8. The method according to claim 1, which further comprises producing, if a data packet is transmitted to a plurality of destinations, only a plurality of messages and placing the messages into a respective queue.

9. A method for operating a switching system for data packets having variable lengths, which comprises:

providing a switching system having inputs and outputs;

temporarily storing complete data packets at an input of the switching system;

if a data packet is received for transmitting to another switching system, sending only a message so that a transmission of data and a transmission of information for defining a sequence for the transmission of the data are independent of one another to an output of the switching system, the message containing a reference, information about priority for correct marshalling of the data packet, and information about a length of the data packet, and, if the data packet is transmitted to a plurality of destinations, only producing a plurality of messages and placing the messages into the respective queue;

queuing a message packet containing at least one message in a waiting queue at the output of the switching system; and returning a further message to an input memory from an appropriate output as soon as the data packet can be dispatched through the output, and only then transmitting the data packet to an appropriate destination.

* * * * *